US009892388B2

(12) United States Patent
Agrawal et al.

(10) Patent No.: US 9,892,388 B2
(45) Date of Patent: *Feb. 13, 2018

(54) SENSORY FEEDBACK INDICATORS FOR TRANSACTIONAL PROCESSES

(71) Applicant: International Business Machines Corporation, Armonk, NY (US)

(72) Inventors: Tushar Agrawal, West Fargo, ND (US); Serge Baduk, East Setauket, NY (US); Robert A. Balfe, Whitesboro, NY (US); Victoria O. Odeyemi, Toronto (CA); Sridhar Satuloori, Irvine, CA (US); Jason A. Smith, Cary, NC (US); Craig M. Trim, Sylmar, CA (US); Vivek Verma, Pune (IN); Albert T. Y. Wong, Hacienda Heights, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,824

(22) Filed: Aug. 14, 2017

(65) Prior Publication Data
US 2017/0337530 A1 Nov. 23, 2017

Related U.S. Application Data

(63) Continuation of application No. 14/796,388, filed on Jul. 10, 2015.

(51) Int. Cl.
*G06Q 20/10* (2012.01)
*G06Q 30/06* (2012.01)
(Continued)

(52) U.S. Cl.
CPC ......... *G06Q 20/10* (2013.01); *G06Q 30/0635* (2013.01); *G08B 6/00* (2013.01); *G08B 21/18* (2013.01); *H04L 67/02* (2013.01)

(58) Field of Classification Search
CPC .... G06Q 20/10; G06Q 30/0635; G08B 21/18; G08B 6/00; H04L 67/02
(Continued)

(56) References Cited

U.S. PATENT DOCUMENTS 5,709,219 A 1/1998 Chen et al.
6,161,126 A 12/2000 Wes et al.
(Continued)

FOREIGN PATENT DOCUMENTS

EP 1605700 A1 12/2005

OTHER PUBLICATIONS

Barth et al., "Web Performance Indicator by Implicit User Feedback—Application and Formal Approach", WISE 2005, LNCS 3806, pp. 689-700, 2005, Copyright Springer-Verlag Berlin Heidelberg 2005.

(Continued)

*Primary Examiner* — Mila Airapetian
(74) *Attorney, Agent, or Firm* — William H. Hartwell

(57) ABSTRACT

A method for providing web transaction feedback includes a client device receiving a response indicating a success or a failure of a user operation pertaining to a potential web transaction. The client device then provides a web transaction feedback to the user using a human interface element capable of causing the client device to perform a set of motions and/or emit a range of temperatures. The set of motions is comprised of at least a first sub-set of the set of motions indicating the success of the user operation and at least a second sub-set of the set of motions indicating the failure of the user operation. The range of temperatures is comprised of at least a first temperature of the range of temperatures indicating the success of the user operation and at least a second temperature of the range of temperatures indicating the failure of the user operation.

1 Claim, 6 Drawing Sheets

(51) Int. Cl.
*G08B 21/18* (2006.01)
*G08B 6/00* (2006.01)
*H04L 29/08* (2006.01)

(58) Field of Classification Search
USPC ........................................................ 705/26.1
See application file for complete search history.

(56) References Cited

U.S. PATENT DOCUMENTS

| | | | |
|---|---|---|---|
| 7,176,888 | B2 | 2/2007 | Marvit et al. |
| 8,364,590 | B1 | 1/2013 | Casey et al. |
| 8,378,794 | B2 | 2/2013 | Alarcon |
| 9,092,060 | B1 * | 7/2015 | Joshi ........................ G06F 3/016 |
| 9,704,144 | B2 | 7/2017 | Agrawal et al. |
| 2008/0201237 | A1 | 8/2008 | Fernandez et al. |
| 2013/0031476 | A1 | 1/2013 | Coin et al. |
| 2015/0081556 | A1 | 3/2015 | Neighrnan et al. |
| 2017/0011367 | A1 | 1/2017 | Agrawal et al. |
| 2017/0011448 | A1 | 1/2017 | Agrawal et al. |

OTHER PUBLICATIONS

Linux Defenders et al.,"Centralized E-Commerce System", IP.com Publication Date: Jul. 29, 2009, IP.com No. 000185645, 7 pages, <http://null/IPCOM/000185645>.
Software Patent Institute, Ricardo A. Cordon, "Using Semantic Knowledge for Transaction Processing", IP.com Publication Date: Oct. 31, 1985, IP.com No. 000150180, IP.com Electronic Publication: Apr. 17, 2007, Database entry Copyright Software Patent institute, 159 pages, <http://null/IPCOM/000150180>.
Stoltz et al., "Guidance Performance Indicator—Web Metrics for Information Driven Web Sites", Proceedings of the 2005 IEEE/WIC/ACM International Conference on Web Intelligence (WI'05), 7 pages, Copyright 2005.
"Warmer Mouse (Temperature Control Mouse)—Toritech", [online] [retrieved on: Dec. 1, 2014], 3 pages, <http://toritech21.en.ec21.com/Warmer_Mouse_Temperature_Control_Mouse--6989457_8505945.html>.
"Ecommerce accessibility purchase—Google Search", [ online] [retrieved on: Dec. 1, 2014], 2 pages, <https://www.google.com/?tbm=pts#q=ecommerce+accessibility+purchase&hl=en&tbm=pts&ei=Ozl2UbbjOleU8AHmj4HICQ&start=0&sa=N&bav=on.2,or.r_gc.r_pw.r_qf.&bvm=bv.43148975,d.b2U&fp=256191d0cc95c406&biw=2133&bih=1052>.
"Elderly e commerce—Google Search", [ online] [retrieved on: Dec. 1, 2014], 2 pages, <https://www.google.com/?tbm=pts&hl=en#hl=en&tbm=pts&sclient=psy-ab&q=elderly+e+commerce&oq=elderly+ecomm&gs_l=hp.3.0.0i22i10i30.1224.8287.0.9747.13.10.0.3.3.1.612.2146.1j6j0j2j0j1.10.0...0.0...1c.1.7.psy-ab.OTqEky69xyA&pbx=1&bav=on.2,or.r_qf&bvm=bv.44342787,d.b2l&fp=302284647560529a&biw=1600&bih=686>.
Agrawal et al., "Sensory Feedback Indicators for Transactional Processes", U.S. Appl. No. 15/673,713, filed Aug. 10, 2017, 40 pages.
IBM, Appendix P, List of IBM Patents or Patent Applications Treated as Related, dated Aug. 14, 2017, 2 pages.

* cited by examiner

SENSORY FEEDBACK INDICATORS FOR TRANSACTIONAL PROCESSES

BACKGROUND

The present invention relates generally to the field of eCommerce, and more particularly to the use of sensory feedback indicators for transactional purposes.

Generally speaking, electronic commerce (eCommerce) is the trading, buying, or selling of products or services using computer networks (e.g., the Internet). Technologies that are used in everyday eCommerce can include mobile commerce, electronic funds transfers, and Internet marketing. Some eCommerce transactions today use technologies such as email, although eCommerce typically uses the World Wide Web for at least part of the transaction.

Sensory feedback indicators are any sense indicators (e.g., vision, hearing, or touch), that may provide a more enhanced feedback to a human user. Tactile feedback, which is a type of sensory feedback, is technology which recreates the sense of touch by applying forces, vibrations, or motions to the user.

SUMMARY

Embodiments of the present invention disclose a method, a computer program product, and a system for providing web transaction feedback. The method includes a client device receiving a response indicating a success or a failure of a user operation pertaining to a potential web transaction. The client device then provides a web transaction feedback to the user, where the web transaction feedback communicates the received response to the user using a human interface element capable of causing the client device to perform a set of motions and/or emit a range of temperatures. The set of motions is comprised of at least a first sub-set of the set of motions indicating the success of the user operation and at least a second sub-set of the set of motions indicating the failure of the user operation. The range of temperatures is comprised of at least a first temperature of the range of temperatures indicating the success of the user operation and at least a second temperature of the range of temperatures indicating the failure of the user operation.

DETAILED DESCRIPTION

Embodiments in accordance with the present invention recognize that motion, sound, and other sense indicators may provide an enhanced eCommerce experience by providing more tactile feedback to the eCommerce user. At present, most eCommerce experiences have been built for people who have good visual skills. As such, people who have accessibility issues (e.g., people with vision issues, people who are color blind, etc.) do not get an ideal eCommerce experience. Developers have responded to these limitations in an ad-hoc fashion by providing inconsistent sensory responses.

While sensory feedback can greatly improve the eCommerce experience for people with accessibility issues, sensory feedback may also enhance the computing experience for all users through improved usability and enhanced realism. For example, improved usability may be accomplished by creating a fulfilling multi-modal experience using the senses of touch, sight, and sound. Sensory feedback (provided, for example, by a human interface element) improves usability by more fully engaging the user's senses, which, in turn, builds user confidence. As used herein, a human interface element is any hardware used in conjunction with software to provide sensory feedback to a user. Some examples of sensory feedback that may be provided by a human interface element include providing touch, sight, and/or sound confirmation while the user is selecting a virtual button.

Sensory feedback may enhance the computing experience by injecting a sense of realism into user experiences by utilizing multiple senses and allowing the user to feel the activating action and nuance of the application. The addition of tactile feedback to applications that rely on visual and audio inputs provides additional context that translates into a sense of realism for the user. By providing users with intuitive and unmistakable tactile confirmation, sensory feedback can create a more confident user experience and can also improve safety by overcoming distractions. This is especially important when audio or visual confirmation is insufficient, such as in industrial applications, or applications that involve distractions, such as automotive navigation.

Figure 1:
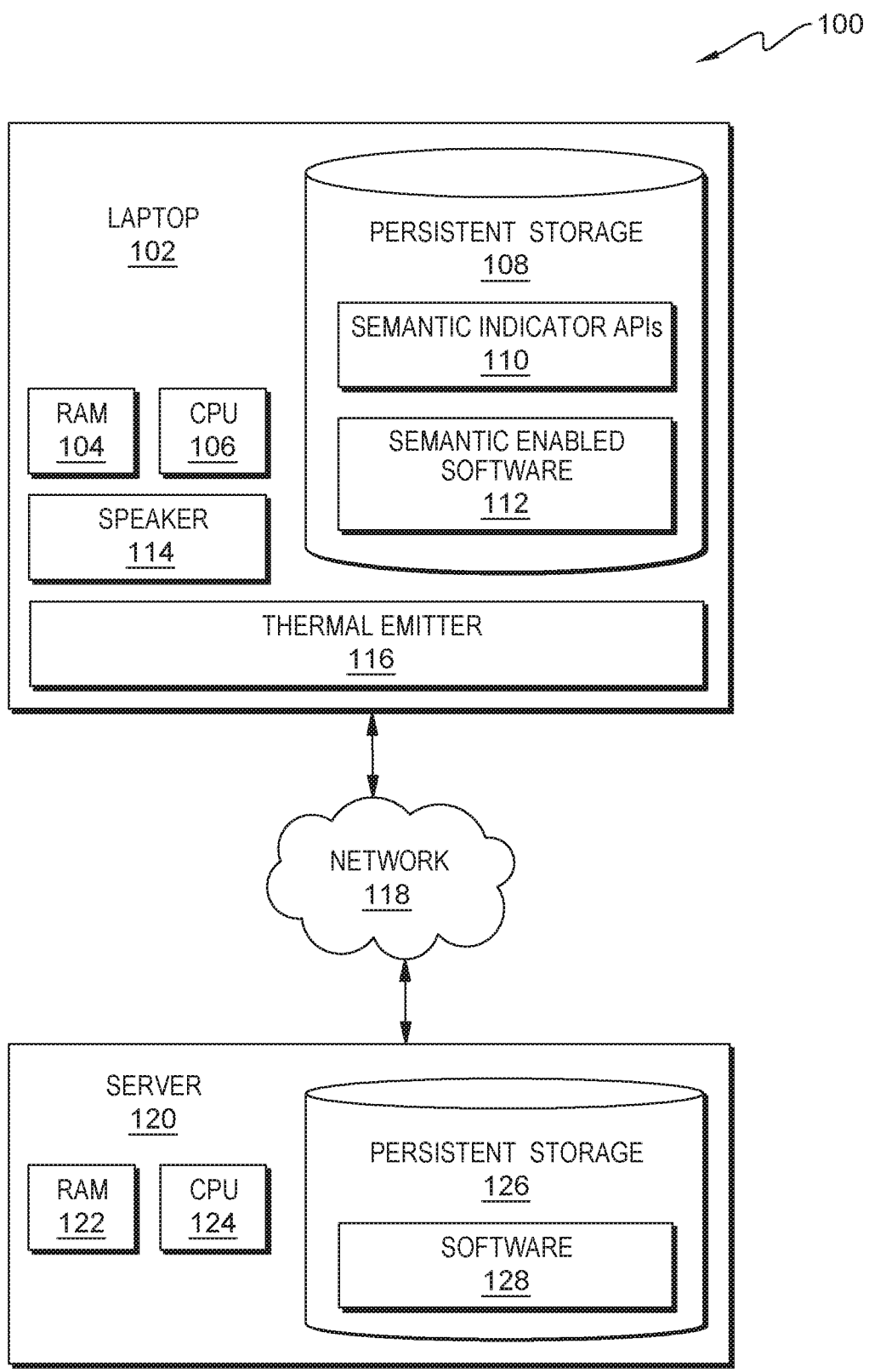
FIG. 1 is a functional block diagram illustrating a sensory feedback response enabled data processing environment, in an embodiment in accordance with the present invention.

The present invention will now be described in detail with reference to the Figures. FIG. 1 is a functional block diagram, generally designated 100, illustrating a sensory feedback response enabled data processing environment, in an embodiment in accordance with the present invention.

Data processing environment 100 includes laptop 102 and server 120, all interconnected over network 118. Laptop 102 includes RAM 104, central processing unit 106, persistent storage 108, speaker 114, and thermal emitter 116.

Laptop 102 may be a Web server, or any other electronic device or computing system, capable of processing program instructions and receiving and sending data. In some embodiments, laptop 102 may be a laptop computer, a tablet computer, a netbook computer, a personal computer (PC), a desktop computer, a personal digital assistant (PDA), a smart phone, or any programmable electronic device capable of communicating over a data connection to network 118. In other embodiments, laptop 102 may represent server computing systems utilizing multiple computers as a server system, such as in a distributed computing environment. In general, laptop 102 is representative of any electronic devices or combinations of electronic devices capable of executing machine-readable program instructions and communicating with server 120 via network 118 and with various components and devices within data processing environment 100.

Laptop 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Sensory feedback APIs 110 and software application 112 are stored in persistent storage 108, which also includes operating system software, as well as, software that enables laptop 102 to communicate with server 120 over a data connection on network 118. Sensory feedback APIs 110 execute on laptop 102 during runtime and provide applications with a set of routines, protocols, and tools for providing sensory feedback or responses to a user initiating a eCommerce transaction.

In one embodiment, sensory feedback APIs 110 reside on a desktop computer and use a motion-activated device, such as a bobblehead figurine, to convey sensory feedback responses. In another embodiment, sensory feedback APIs 110 reside on a handheld device providing sensory feedback responses by emitting hot or cold temperatures. In general, sensory feedback APIs 110 may reside on any computer, server, phone, or electronic device that may be used to initiate electronic operations or requests, and the electronic operations or requests provide a response to the user.

The sensory feedback response settings for speaker 114 and thermal emitter 116 are configurable by the user through sensory feedback APIs 110 and software application 112. In one embodiment, these settings may be controlled through a utility using a graphic interface and stored on laptop 102. In another embodiment, the sensory feedback response settings may be configurable on an application basis and stored in configuration files for the application. In other embodiments, an administrator may define the sensory feedback response settings on a repository located on or attached to network 118, where all semantic enabled devices would use the same defined sensory feedback responses for user operations.

Software application 112 is also included in persistent storage 108. Software application 112 uses sensory feedback APIs 110 to translate responses to user operations into a tactile feedback response using sight, sound, and/or temperature indications. In one embodiment, software application 112 may be a web browser providing a user with the ability to initiate web transactions. A web transaction may occur when a customer makes a purchase on a web page by completing and submitting a web form and performing other interactions with a website and/or web application. A web page is a document on the World Wide Web (WWW) that is displayed using a web browser. A web page is typically a computer file that is usually written in HTML or comparable markup language. Web browsers coordinate the various web resource elements for the written web page, such as style sheets, scripts and images, to present the web page. Web pages may be static (i.e., delivered exactly as stored on the web server), or dynamic (i.e., generated by a web application that is driven by server-side software or client-side scripting). Dynamic web pages help the browser (e.g., software application 112) to enhance the web page through user input to the server (e.g., server 120). A web form, also called a HTML form, on a web page allows a user to enter data that is sent to a server for processing. Users fill out the forms using web page elements (i.e., checkboxes, radio buttons, or text fields). An example of a web form is a form where a user enters shipping or credit card data to order a product for an eCommerce web transaction. In another embodiment, software application 112 may be an email application. In general, software application 112 may be any software application capable of receiving defined responses, in the context of the application, or a standardized set of responses, that may be converted a sensory feedback response using sensory feedback APIs 110.

Laptop 102 includes speaker 114 (i.e., human interface element). Speaker 114 is used by software application 112 to emit sounds corresponding to the indicated response received from the user operation. In one embodiment, speaker 114 may be used by sensory feedback APIs 110 and software application 112 solely. In another embodiment, speaker 114 may be used by other software applications and components of laptop 102 in conjunction with sensory feedback APIs 110 and software application 112. In other embodiments, speaker 114 may be an additional component to laptop 102 used only by sensory feedback APIs 110 and software application 112.

Thermal emitter 116 is also included in laptop 102. Thermal emitter 116 (i.e., human interface element) is used by sensory feedback APIs 110 and software application 112 to emit a thermal response to user operations on software application 112. In one embodiment, thermal emitter 116 may be contained in laptop 102 where a user's wrists rest on the keyboard, emitting thermal responses felt by the user. In another embodiment, thermal emitter 116 may be contained in a computer accessory, such as a pointing device (e.g., a mouse). Laptop 102 may include internal and external hardware components, as depicted and described in further detail with respect to FIG. 2.

In FIG. 1, network 118 is shown as the interconnecting fabric between laptop 102 and server 120. In practice, network 118 may be any viable data transport network. Network 118 can be, for example, a local area network (LAN), a wide area network (WAN) such as the Internet, or a combination of the two, and can include wired, wireless, or fiber optic connections. In general, network 118 can be any combination of connections and protocols that will support communications between laptop 102 and server 120 in accordance with an embodiment of the invention.

Data processing environment 100 also includes server 120. Data processing environment 100 includes server 120. In the example embodiment of the present invention, server 120 is a device attached to network 118 and capable of communicating with laptop 102. Server 120 contains RAM 122, central processing unit (CPU) 124, and persistent storage 126. Persistent storage 126 may, for example, be a hard disk drive. Alternatively, or in addition to a magnetic hard disk drive, persistent storage 126 may include a solid state hard drive, a semiconductor storage device, read-only memory (ROM), erasable programmable read-only memory (EPROM), flash memory, or any other computer-readable storage medium that is capable of storing program instructions or digital information. Software 128 is stored in persistent storage 126, which also includes operating system software, as well as, software that enables server 120 to communicate with laptop 102 over a data connection on network 118. In the example embodiment of the present invention, server 120 is a computer hosting an eCommerce website providing responses to transactions originating from laptop 102 on network 118.

Figure 2:
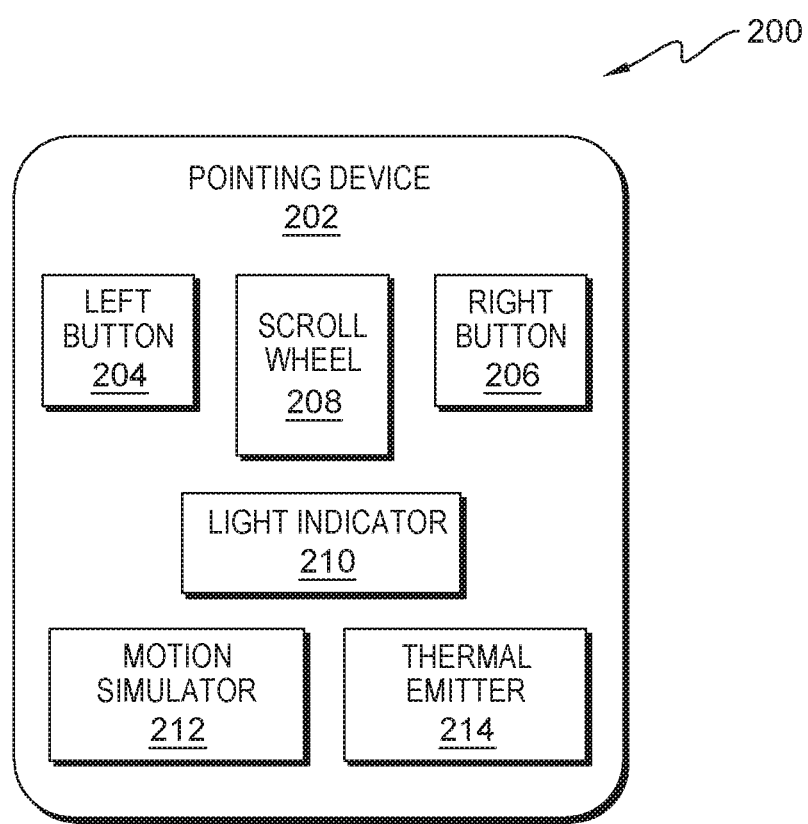
FIG. 2 is a functional block diagram illustrating a semantic enabled pointing device, used within the sensory feedback response enabled data processing environment of FIG. 1, for providing sensory feedback responses to user actions, in an embodiment in accordance with the present invention.

FIG. 2 is a functional block diagram, generally designated 200, illustrating a semantic enabled pointing device (also referred to as a "client device"), used within the sensory feedback response enabled data processing environment of FIG. 1, for providing sensory feedback responses to user actions, in an embodiment in accordance with the present invention. Pointing device 202 contains left button 204, scroll wheel 208, right button 206, light indicator 210, motion simulator 212, and thermal emitter 214 (also referred to as a "thermal simulator"). In this example embodiment, in addition to being a device that provides sensory feedback responses to the user, pointing device 202 is an accessory device used with laptop 102 by a user to navigate the displayed area of software application 112 and to initiate eCommerce transactions with server 120 over a data connection on network 118. In another embodiment, pointing device 202 may utilize a trackball to detect motion from the user. In other embodiments, pointing device 202 may utilize optics to detect motion from the user.

Pointing device 202 includes left button 204. Left button 204 is a microswitch which can be pressed to select or interact with an element of a graphical user interface on laptop 102. A microswitch is an electrical switch that is small in size and that can be actuated by very little physical force. Right button 206 is also a microswitch used to invoke a contextual menu in the computer's software user interface, which contains options specifically tailored to the interface element over which the mouse cursor currently sits. In one embodiment, the primary mouse button sits located on the left-hand side of the mouse, for the benefit of right-handed users. In other embodiments, left-handed users may reverse this configuration via configuration software or a utility. Scroll wheel 208 is a hard plastic, or rubbery disc (i.e., wheel), that can also act as another microswitch to activate contextual menus in applications such as software application 112, or can be used to navigate the displayed application page.

Pointing device 202 also includes light indicator 210. Light indicator 210 (i.e., human interface element) is used by software application 112 through sensory feedback APIs 110 on laptop 102 to provide a visual indication response to the user's operations. Light indicator 210 is configurable by the user through a utility or by software application 112. In one example embodiment, light indicator 210 may illuminate a green color to the user when indicating success. In another example embodiment, light indicator 210 may illuminate a yellow color in situations when the user submits a form with missing information, such as an incomplete address field. In other example embodiments, light indicator 210 may illuminate a red color when indicating a failure or error, such as the user's credit card being declined. Light indicator 210 may be located anywhere in pointing device 202 to allow a user to see the sensory feedback response. In another example embodiment, pointing device 202 may be constructed of transparent plastic to allow light indicator 210 to illuminate the entire device.

Motion simulator 212 is also included in pointing device 202. Motion simulator 212 (i.e., human interface element) is used by software application 112 through sensory feedback APIs 110 on laptop 102 to provide a motion or vibration indication response to the user's operations. Motion simulator 212 is configurable by the user through a utility or by software application 112. In one example embodiment, motion simulator 212 may buzz for a tenth of a second for the user when indicating success. In another example embodiment, motion simulator 212 may buzz for three tenths of a second in situations when the user submits a form with missing information, such as an incomplete address field. In other example embodiments, motion simulator 212 may buzz for a half of a second indicating a failure or error, such as the user's credit card being declined. In another example embodiment, motion simulator 212 may be a computer accessory, such as a bobblehead figurine, that bobbles or nods its head to indicate a successful operation or transaction and shakes its head from side-to-side to indicate a failed operation or transaction. In other example embodiments, the computer accessory bobblehead may also incorporate sounds and light indicators in addition to the motion.

Pointing device 202 also includes thermal emitter 214. Thermal emitter 214 (i.e., human interface element) is used by software application 112 through sensory feedback APIs 110 on laptop 102 to provide a motion or vibration indication response to the user's operations. Thermal emitter 214 is configurable by the user through a utility or by software application 112. In one example embodiment, thermal emitter 214 may emit a cool temperature of 69 degrees Fahrenheit felt by the user when indicating success. In another example embodiment, thermal emitter 214 may emit a warm temperature of 87 degrees Fahrenheit felt by the user when a form with missing information is submitted, such as an incomplete address field. In other example embodiments, thermal emitter 214 may emit a hot temperature of 100 degrees Fahrenheit felt by the user to indicate a failure or error, such as the user's credit card being declined. In general, software application 112 and/or sensory feedback APIs 110 may provide a user with configuration options to define a sub-range in the range of temperatures thermal emitter 214 may produce to communicate the success of the user operation and a second sub-range in the range of temperatures to communicate the failure of the user operation.

In one example embodiment, light indicator 210 may illuminate a green color, motion simulator 212 may buzz for a tenth of a second, and thermal emitter 214 may emit a cool temperature of 69 degrees Fahrenheit to the user when indicating a successful transaction. In another example embodiment, light indicator 210 may illuminate a yellow color, motion simulator 212 may buzz for three tenths of a second, and thermal emitter 214 may emit a warm temperature of 87 degrees Fahrenheit in situations when the user submits a form with missing information, such as an incomplete address field. In other example embodiments, light indicator 210 may illuminate a red color, motion simulator 212 may buzz for a half of a second, and thermal emitter 214 may emit a hot temperature of 100 degrees Fahrenheit when indicating a failure or error, such as the user's credit card being declined.

Figure 3:
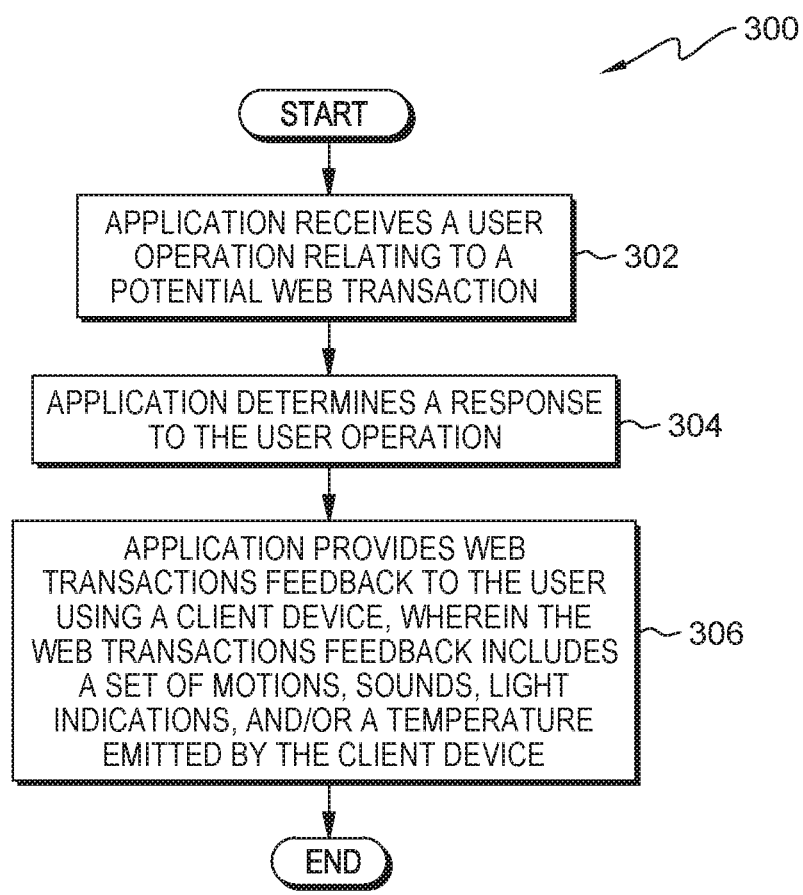
FIG. 3 is a flowchart depicting operational steps of a web transaction feedback application, on a client within the data processing environment of FIG. 1, providing feedback to a user operation pertaining to a potential web transaction, in an embodiment in accordance with the present invention.

FIG. 3 is a flowchart, generally designated 300, depicting operational steps of a web transaction feedback application, on a client within the data processing environment of FIG. 1, providing feedback to a user operation pertaining to a potential web transaction, in an embodiment in accordance with the present invention. Software application 112, on laptop 102, receives a user operation relating to a potential web transaction as depicted in step 302. In some embodiments (discussed below), software application 112 receives one or more dynamically generated web page elements of a web document, where the one or more web page elements are adapted to receive information entered by the user. In this example embodiment, software application 112 may be a web browser on a laptop computing device, (e.g., laptop 102), used to initiate eCommerce transactions over the Internet. In other example embodiments, software application 112 may be an email application, or an application suite consisting of multiple applications bundled together, where a user initiates and receives responses for web transactions. In another example embodiment, software application 112 may be enterprise software addressing the needs of an entire organization's processes and data, (e.g., web enabled enterprise resource planning systems, customer relationship management (CRM) systems and supply chain management software using web transaction interfaces). In another example embodiment, software application 112 may be web enabled educational software delivering homework and/or evaluations (e.g., tests or exams), tracking a student's progress through online material, or including collaborative capabilities where a user initiates and receives responses for web transactions. In another example embodiment, software application 112 may be simulation software, simulating physical or abstract systems for research, training or entertainment purposes, where the simulation software includes web transaction functionality.

In this example embodiment, laptop 102 is a portable computing device used to initiate eCommerce transactions over the Internet. In other example embodiments, the laptop 102 may be replaced by a mobile phone or smartphone, a tablet personal computer (PC) or notebook, an in-car computer, a game console, a personal digital assistant (PDA), programmable calculator, or a hand-held game console. In general, laptop 102 (or, more generally, the device used to receive the user operation) may be any computing device capable of initiating and receiving responses for user operations and requests.

Software application 112, on laptop 102, then determines a response to the user operation as depicted in step 304. In this example embodiment, the determination of a response includes determining whether the potential web transaction is successfully completed. If the potential web transaction is successfully completed, then the response is "YES." If the potential web transaction is not successfully completed, the response is "NO. In this example embodiment, the determined sensory feedback response to the user operation may be communicated by translating a hypertext transfer protocol (HTTP) return (or "response") code into a defined sensory feedback response. In other example embodiments, the determined sensory feedback response to the user operation may be determined via translating a file transfer protocol (FTP) return code. In another example embodiment, the determined sensory feedback response to the user operation may be determined by translating a standardized error code as defined in "errno.h", (i.e., a header file in the standard library of the C programming language), that defines macros for reporting and retrieving error conditions through error codes stored in a static memory location. In another example embodiment, sensory feedback APIs 110 may be used to translate a response from an anti-virus application reporting to a user that just clicked on a URL for a malicious website. In general, the determined response to the user operation may be any response, or return code capable of being interpreted into a semantic indicator(s) by sensory feedback APIs 110.

As stated above, in some embodiments, the response to the user operation may be delivered in the form of an HTTP response code. Generally speaking, HTTP status or response codes are defined into five classes: informational, success, redirection, client error, and server error. An example of an informational response code is a "Continue" (e.g., HTTP response code 100), which means the server has received the request headers, and that the client should proceed to send the request body (i.e., the client should continue with its request). An example of a success response code is "OK" (e.g., HTTP response code 200), which means the HTTP request was successful. An example of a client error response code is "Multiple choices" (e.g., HTTP response code 300), which indicates there are multiple options for the resource that the client may follow. For example, the resource could be used to present different format options for video, list files with different extensions, or word sense disambiguation. An example of a client error response code is "Bad Request" (e.g., HTTP response code 400), which means the server cannot or will not process the request due to something that is perceived to be a client error (e.g., a malformed request). An example of a server error response code is an "Internal Server Error" (e.g., HTTP response code 500) that means an unexpected condition was encountered.

Sensory feedback APIs 110 is a set of routines, protocols, and tools for enhancing existing or developing new software applications with sensory feedback indicators for operational responses received by the user. Sensory feedback APIs 110 may express application return codes in terms of its operations, inputs, outputs, and underlying types. Sensory feedback APIs 110 accomplish this by using web page elements (e.g., checkboxes, radio buttons, or text fields) to receive user entered information. Software application 112 may use the sensory feedback APIs 110 to store the user entered information along with metadata including, for example, the indicated type of input (e.g., Name or Address field). An example of this would be a sensory feedback response where a user submits a web form for an eCommerce transaction and forgets to enter the credit card expiration date. The client device, using sensory feedback APIs 110, may validate the entered information and activate a motion-activated device where the motion-activated device performs a motion relating to the defined sensory feedback response to the user operation. In one example embodiment, the motion-activated device may pop up small signs with customizable messages to the users liking. In another example embodiment, the motion-activated device may display and wave racing flags relating to the defined sensory feedback response to the user operation. A sensory feedback response for the example of a user forgetting to enter the credit card expiration date may be the motion-activated device displaying and waving a "caution" flag. In another example embodiment using a motion-activated bobblehead figurine, the bobblehead figurine may shake its head in a side-to-side motion indicating a failure has occurred. The bobblehead figurine may also then emit the sound wave stating "Ah Ah Ah! You forgot the expiration date!" In some cases, the bobblehead figurines eyes may glow or flash red.

In one example embodiment, sensory feedback APIs 110 may be used to create a plug-in for existing software applications to be used with a motion-activated device. A user may purchase a motion-activated device with a software installation package that would install a plug-in to allow existing applications on a computing device to provide sensory feedback with the motion-activated device. In another example embodiment, the semantic indicator feedback may be customized to multiple users of laptop 102 using radio-frequency identification (RFID) technology. RFID is the wireless use of electromagnetic fields to transfer data, for the purposes of automatically identifying and tracking tags attached to objects. Users may carry RFID tags containing electronically stored information to gain access to building and secure areas. These RFID tags may also contain sensory feedback indicators for the user and detected by software application 112 when the user submits requests or operations on laptop 102.

Software application 112 then provides web transaction feedback to the user using a client device, wherein the web transaction feedback includes using one or more of a set of motions, sounds, light indications, and a temperature emitted by the client device, as depicted in step 306. Software application 112 uses sensory feedback APIs 110 to access a client device to provide a determined sensory feedback response to a user based on the response that was returned to software application 112 for the user's transaction or request. In one example embodiment, software application 112 uses sensory feedback APIs 110 to cause a large smiley face to appear on the touch screen of a smart phone and emit a sound wave of cheers when a user successfully submits a payment for a bill with their online banking app. In another example embodiment, software application 112 uses sensory feedback APIs 110 to vibrate a mouse and emit a range of temperatures felt by the user's hand in response to a transaction or operation.

In one example embodiment, the motions and vibrations simulated by motion simulator 212 may be configured via a graphical user interface (GUI) and the configuration settings stored in a configuration file in persistent storage 108. The example configuration file may contain defined motions for a client device or a computer accessory for various vibrations and motions. In one example embodiment, motion simulator 212 in pointing device 202 vibrates with three strong bursts when a user clicks on a phishing web link. Phishing is an attempt by a person or persons to acquire sensitive information such as usernames, passwords, and/or credit card details by masquerading as a trustworthy entity in an electronic communication such as a website or email. In another example embodiment, pointing device 202 may vibrate and emit a 103 degree temperature when a user tried to submit a web form on a website that is not secure.

In another example embodiment, the sound waves emitted by speaker 114 may be configured via a graphical user interface (GUI) and the configuration settings stored in a configuration file in persistent storage 108. The example configuration file may contain defined sound waves for sensory feedback responses in any digitized sound format. Sounds may be recorded by the user to provide a custom response for a given scenario. An example of a defined sound wave would be the sound of a cash register upon completing a transaction successfully.

In another example embodiment, the light radiated by light indicator 210 may be configured via a graphical user interface (GUI) and the configuration settings stored in a configuration file in persistent storage 108. The example configuration file may contain defined illuminations for sensory feedback responses as certain colors, flashes, pulses, varying illuminations or any illumination used in electronic devices. An example of a defined light indication would be using Morse Code to deliver a sensory feedback response in a motion-activated device such as a bobblehead figurine resembling Samuel Morse (i.e., the inventor of Morse Code), by flashing the figurines eyes with "- - - pause - . -" to spell out "OK". Morse code is a method of transmitting text information as a series of on-off tones, lights, or clicks that can be directly understood by a skilled listener or observer without special equipment. In other embodiments, sensory feedback APIs 110 may display (or emit, via speaker 114) natural language content indicating one or more reasons why the potential web transaction is or is not successfully completed.

In another example embodiment, the temperatures emitted by thermal emitter 116 and thermal emitter 214 may be configured via a graphical user interface (GUI) and the configuration settings stored in a configuration file in persistent storage 108. The example configuration file may contain defined temperatures for sensory feedback responses as specific values or ranges. An example of a defined cool temperature range may be 50 to 65 degrees Fahrenheit, (10 to 18 degrees Celsius). An example of a defined warm temperature range may be 80 to 85 degrees Fahrenheit, (26 to 29 degrees Celsius). An example of a defined hot temperature range may be 90 to 100 degrees Fahrenheit, (32 to 37 degrees Celsius).

Figure 4:
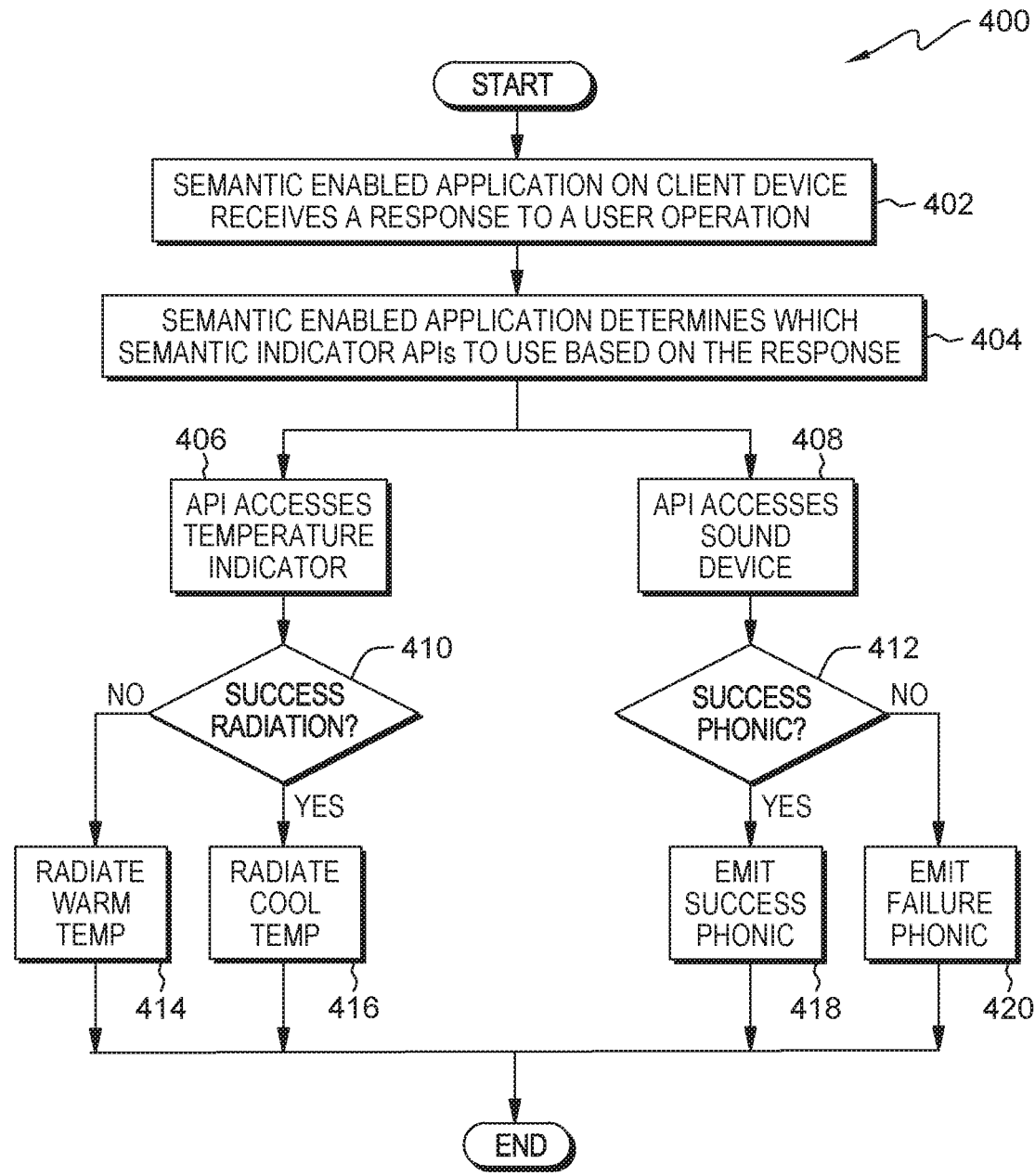
FIG. 4 is a flowchart depicting operational steps of a semantic enabled application, on a client device within the data processing environment of FIG. 1, converting feedback to a user operation to a sensory feedback response, in an embodiment in accordance with the present invention.

FIG. 4 is a flowchart, generally designated 400, depicting operational steps of a semantic enabled application, on a client device within the data processing environment of FIG. 1, converting feedback to a user operation to a sensory feedback response, in an embodiment in accordance with the present invention. Software application 112 on laptop 102 receives a response to a user transaction or operation to server 120 as depicted in step 402. The response received by software application 112 may be any standardized response, such as an HTTP status code, or a defined response code unique to software application 112. In this example embodiment, the client device is laptop 102 using speaker 114 and thermal emitter 116 to provide sensory feedback to the user.

In step 404, software application 112 determines which sensory feedback APIs 110 to use, to provide sensory feedback to the user, based on the response received by software application 112. Software application 112 determines this by using a configuration file where the received responses for user operations are defined and mapped to sensory feedback responses. In one example embodiment, the mapped sensory feedback responses may be configurable through a GUI utility by the user to provide a custom experience. In another example embodiment, the mapped sensory feedback responses are customized to the specific application so that the same response produces a different sensory feedback response for different applications. An example of this would be using laptop 102 to submit an online order and then email a coworker. When the user clicks on "submit" and a successful response is received, thermal emitter 116 emits a cool temperature of 65 degrees Fahrenheit, (18 degrees Celsius), and speaker 114 emits a sound wave of a bird chirping. The user then sends an email to inform the coworker that the order has been placed. When the user clicks on send and a successful response is received, thermal emitter 116 emits a cool temperature of 68 degrees Fahrenheit, (20 degrees Celsius), and speaker 114 emits a sound wave of a cruise ship air horn.

Upon determining the sensory feedback responses in step 404, software application 112 will access one or more sensory feedback components of laptop 102. In step 406, software application 112, through the use of sensory feedback APIs 110, accesses thermal emitter 116 to provide a warm or cool temperature felt by the user where their wrists rest on the keyboard. In another example embodiment, the warm or cool temperature may be emitted through the keys of laptop 102. In another embodiment, the warm or cool temperature may be emitted on the bottom of laptop 102 so the temperature change would be felt on the user's legs. In other embodiments, the warm or cool temperature may be emitted on the sides of laptop 102.

In decision step 410, sensory feedback APIs 110 determines if the success radiation indication should be performed for the defined application return code. If the success radiation indication is selected ("yes" branch, decision 410), thermal emitter 116 radiates a cool temperature felt by the user and depicted in step 416. In one example embodiment, thermal emitter 116 may be a fashion accessory such as a bracelet that is connected to laptop 102 by a wired or wireless connection, where the bracelet generates the warm or cool temperature felt by the user. If the failure radiation indication is selected ("no" branch, decision 410), thermal emitter 116 radiates a hot temperature felt by the user and depicted in step 414. In one example embodiment, thermal emitter 116 may use solar energy to power thermal emitter 116 when emitting the warm or cool temperature to the user.

In step 408, software application 112, through the use of sensory feedback APIs 110, accesses speaker 114 to emit a sound wave heard by the user. In another example embodiment, speaker 114 may be a headphone or ear bud device connected to laptop 102 through a wired or wireless connection, where the headphone or ear buds emit the sound wave heard by the user. In decision step 412, sensory feedback APIs 110 determines if the success sound wave should be performed for the defined application return code. If the success sound wave is selected ("yes" branch, decision 412), speaker 114 emits a sound wave indicating the operation was successful by the user and depicted in step 418. In one example embodiment, sensory feedback APIs 110 may use a hardware device to transmit the sound wave directly to a surgically implanted electronic device, similar to a cochlear implant that would emit the sound wave to the user. A cochlear implant (CI) is a surgically implanted electronic device that provides a sense of sound to a person who is profoundly deaf or severely hard of hearing.

If the success sound wave is not selected ("no" branch, decision 412), speaker 114 emits a sound wave indicating the operation was not successful by the user and depicted in step 420. In one example embodiment, an in-car computer may use a traffic officer bobblehead figurine to provide a visual indication from a global positioning system (GPS) by lifting its arms to point in the direction of travel. When the driver takes a wrong turn a speaker in the traffic officer bobblehead figurine may emit a sound wave to indicate the wrong direction of travel.

Figure 5:
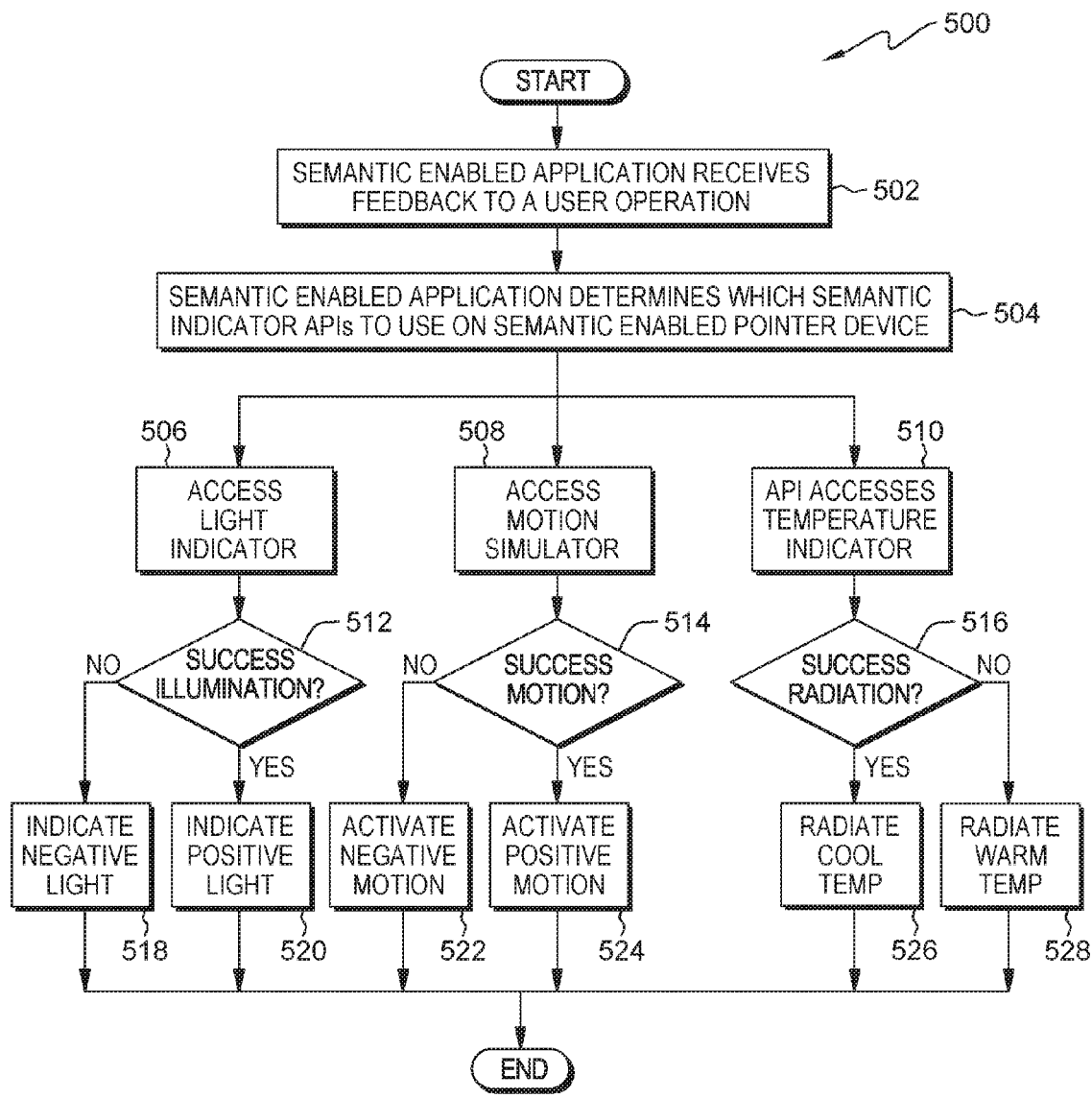
FIG. 5 is a flowchart depicting operational steps of a semantic enabled pointer device receiving a sensory feedback response from a semantic enabled application, on a client device within the data processing environment of FIG. 1, in an embodiment in accordance with the present invention.

FIG. 5 is a flowchart, generally designated 500, depicting operational steps of a semantic enabled pointer device receiving a sensory feedback response from a semantic enabled application, on a client device within the data processing environment of FIG. 1, in an embodiment in accordance with the present invention. Software application 112 on laptop 102 receives a response to a user transaction or operation to server 120 as depicted in step 502. In this example embodiment, pointing device 202 is an accessory device used with laptop 102 by a user to initiate eCommerce transactions with server 120 over a data connection on network 118. In another example embodiment, laptop 102 may be any computing device capable of interfacing with pointing device 202.

In step 504, software application 112 determines which sensory feedback APIs 110 to use with pointing device 202, to provide a sensory feedback to the user, based on the response received by software application 112. Software application 112 compares the received response, also referred to as the "received result", of the user operation to a set of defined user responses for user operations with mapped sensory feedback actions in a configuration file. In one example embodiment, pointing device 202 may be contained in a pen utilizing a wireless connection to laptop 102. The pen functions as both a writing instrument and navigation device for the display of laptop 102. In another example embodiment, semantic indicator APIs may be used in a cloud computing environment delivering sensory feedback responses to the provided applications and services of the cloud. In the event that the motion-activated device is unable to provide a sensory feedback, software application 112 and/or sensory feedback APIs 110 will provide a notification to the user by emitting a sound wave using speaker 114 and/or displaying a message on display 620 which is described in further detail with respect to FIG. 6.

In one example embodiment where the motion-activated device is unable to provide a sensory feedback to a user operation, software application 112 receives and displays an error from sensory feedback APIs 110 to the user that the motion-activated device is unable to provide a sensory feedback for the determined response to the user operation. One example would be software application displaying a popup on display 620 and emitting a sound on speaker 114 to indicate that the motion-activated device is not detected. The displayed message may instruct the user to check the connection to the motion-activated device and try the operation again (assuming the operation is not a request for a potential web transaction).

In another example embodiment where the motion-activated device is unable to provide a sensory feedback to a user operation, software application 112 receives and displays an error from sensory feedback APIs 110 to the user that the motion-activated device is not working properly. One example would be sensory feedback APIs 110 detects that thermal emitter 116 is no longer functioning and displays a popup on display 620 and emits a sound on speaker 114 to indicate that thermal emitter 116 is not operational. The displayed message may instruct the user to launch a utility to test the motion-activated device to determine the problem.

Upon determining the sensory feedback responses in step 504, software application 112 accesses one or more sensory feedback components of laptop 102 including pointing device 202. In step 506, software application 112, through the use of sensory feedback APIs 110, accesses light indicator 210 to provide a visual indication response in pointing device 202 to the user's operations. In another example embodiment light indicator 210 may be part of a holographic bobblehead figurine providing sensory feedback responses to a user transaction or operation on laptop 102. In decision step 512, sensory feedback APIs 110 determines if the success light indication should be performed for the defined application return code. If the success light indication is selected ("yes" branch, decision 512), light indicator 210 illuminates with a light indicating the operation was successful by the user and depicted in step 520. If the success light indication is not selected ("no" branch, decision 512), light indicator 210 illuminates with a light indicating the operation was not successful by the user and depicted in step 518. In one example embodiment, an in-car computer may use light indicator 210 to project the traffic lines of streets and highways on the windshield of a driver's car. When the driver verbally or manually enters a destination address to the in-car computer or GPS, light indicator 210 may emit light on the windshield that appears to highlight street signs, building, or landmarks as the driver travels the plotted route.

In step 508, software application 112, through the use of sensory feedback APIs 110, accesses motion simulator 212 to provide a motion or vibration indication response to the user's eCommerce transactions or operations. In another example embodiment motion simulator 212 may be may be a fashion accessory such as a bracelet that is connected to laptop 102 by a wired or wireless connection, where the bracelet generates vibrations felt by the user. In decision step 514, sensory feedback APIs 110 determines if the success motion indication should be performed for the defined application return code. If the success motion indication is selected ("yes" branch, decision 514), motion simulator 212 generates a motion or vibration indicating the operation was successful by the user and depicted in step 524. If the success motion indication is not selected ("no" branch, decision 514), motion simulator 212 generates a motion or vibration indicating the operation was not successful by the user and depicted in step 522.

In step 510, software application 112, through the use of sensory feedback APIs 110, accesses thermal emitter 214 to provide a warm or cool temperature felt by the user while the users hand is on pointing device 202. In another example embodiment, thermal emitter 214 may be used to provide a warm or cool sensory feedback response in a fashion accessory such as a ring that is connected to laptop 102 by a wired or wireless connection, where the ring generates the warm or cool temperature felt by the user. In decision step 516, sensory feedback APIs 110 determines if the success radiation indication should be performed for the defined application return code. If the success radiation indication is selected ("yes" branch, decision 516), thermal emitter 214 radiates a cool temperature felt by the user and depicted in step 526. If the failure radiation indication is selected ("no" branch, decision 516), thermal emitter 214 radiates a hot temperature felt by the user and depicted in step 528. In one example embodiment, thermal emitter 214 may use solar energy to radiate to power thermal emitter 214 when emitting the warm or cool temperature to the user. In general, thermal emitter 214 is fully customizable by the user to provide the full range of temperatures for the sensory feedback responses for user operations.

Figure 6:
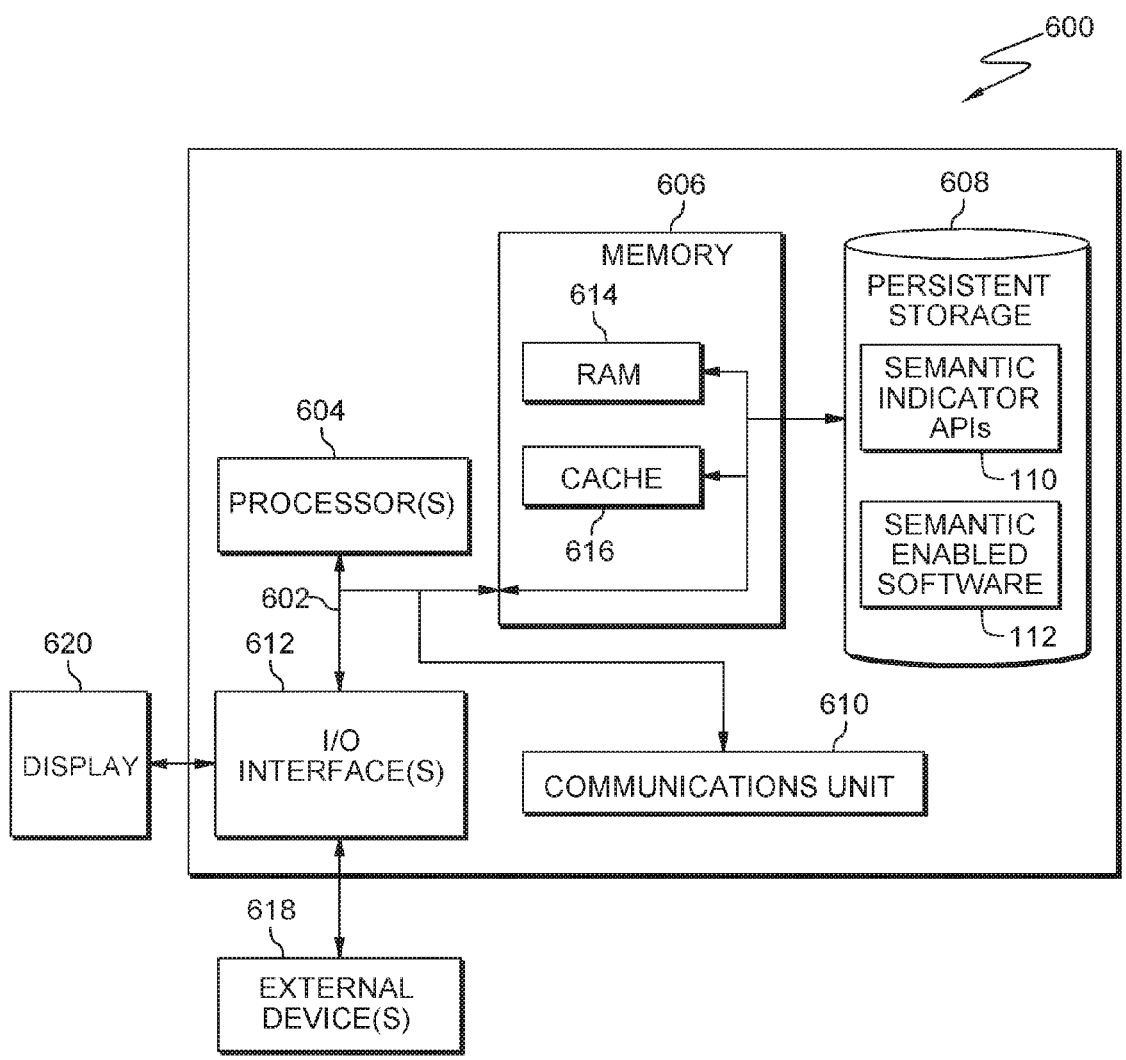
FIG. 6 depicts a block diagram of components of a laptop computer converting responses to user operations to sensory feedback responses, in an embodiment in accordance with the present invention.

FIG. 6 depicts a block diagram, generally designated 600, of components of a laptop computer converting responses to user operations to sensory feedback responses, in an embodiment in accordance with the present invention. It should be appreciated that FIG. 6 provides only an illustration of one implementation and does not imply any limitations with regard to the environments in which different embodiments may be implemented. Many modifications to the depicted environment may be made.

Laptop 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Sensory feedback APIs 110 and software application 112 are stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of network 118 and server 120. In these examples, communications unit 610 includes one or more network interface cards. Communications unit 610 may provide communications through the use of either or both physical and wireless communications links. Sensory feedback APIs 110 and software application 112 may be downloaded to persistent storage 608 through communications unit 610.

I/O interface(s) 612 allows for input and output of data with other devices that may be connected to laptop 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., sensory feedback APIs 110 and software application 112, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, "and/or" is defined as an "inclusive or." For example, A, B "and/or" C means that at least one of A or B or C is true and applicable.

What is claimed is:
1. A computer system comprising:
one or more computer processors;
one or more computer readable storage media;
program instructions stored on the computer readable storage media for execution by at least one of the one or more processors, the program instructions comprising:
program instructions to receive, by a client device, a first response indicating a success or a failure of a first user operation pertaining to a potential web transaction, wherein the first user operation includes the user attempting to submit sensitive information using a web form on a website, and wherein the received first response indicates whether the website is a secure website or an unsecure website;
program instructions to determine, by the client device, first web transaction feedback, wherein the first web transaction feedback communicates the received first response to the user;
program instructions to provide, by the client device, the first web transaction feedback to the user using a thermal emitter capable of causing the client device to emit a range of temperatures;

program instructions to receive, by the client device, a second response indicating a success or a failure of a second user operation pertaining to the potential web transaction, wherein the second user operation includes the user submitting payment information for the potential web transaction, and wherein the received second response indicates whether the payment information submitted by the user has been successfully approved or unsuccessfully approved;

program instructions to determine, by the client device, second web transaction feedback, wherein the second web transaction feedback communicates the received second response to the user;

program instructions to provide, by the client device, the second web transaction feedback to the user using a motion simulator capable of causing the client device to perform a set of motions;

wherein at least a first sub-range of the range of temperatures communicates the success of the first user operation and at least a second sub-range of the range of temperatures communicates the failure of the first user operation, wherein the temperatures of the first sub-range of the range of temperatures are cooler than the temperatures of the second sub-range of the range of temperatures; and wherein at least a first sub-set of the set of motions communicates the success of the second user operation and at least a second sub-set of the set of motions communicates the failure of the second user operation, wherein the motions of the first sub-set of the set of motions include buzzes with durations of time that are less than durations of time of buzzes of the motions of the second sub-set of the set of motions.

* * * * *